US012517980B2

(12) United States Patent
Bali et al.

(10) Patent No.: US 12,517,980 B2
(45) Date of Patent: Jan. 6, 2026

(54) METHODS AND SYSTEMS FOR AUTOMATED DOCUMENT CLASSIFICATION WITH PARTIALLY LABELED DATA USING SEMI-SUPERVISED LEARNING

(71) Applicant: NetApp, Inc., Sunnyvale, CA (US)

(72) Inventors: Adam Bali, Tel-Aviv (IL); Yuval Alaluf, Tel Mond (IL)

(73) Assignee: NETAPP, INC., San Jose, CA (US)

(*) Notice: Subject to any disclaimer, the term of this patent is extended or adjusted under 35 U.S.C. 154(b) by 1048 days.

(21) Appl. No.: 16/945,420

(22) Filed: Jul. 31, 2020

(65) Prior Publication Data
US 2022/0036134 A1 Feb. 3, 2022

(51) Int. Cl.
*G06N 20/00* (2019.01)
*G06F 18/214* (2023.01)
*G06F 18/23213* (2023.01)
*G06F 18/2415* (2023.01)

(52) U.S. Cl.
CPC .... *G06F 18/2155* (2023.01); *G06F 18/23213* (2023.01); *G06F 18/24155* (2023.01); *G06N 20/00* (2019.01)

(58) Field of Classification Search
CPC ........ G06N 20/00; G06N 3/0895; G06N 3/09; G06F 18/2155; G06F 18/23213; G06F 18/24155; G06F 21/6245
See application file for complete search history.

(56) References Cited

U.S. PATENT DOCUMENTS

| 9,477,503 | B2 | 10/2016 | Masuda et al. |
| 10,063,582 | B1 * | 8/2018 | Feng .................. H04L 63/1433 |
| 10,678,573 | B2 | 6/2020 | Shah et al. |

(Continued)

FOREIGN PATENT DOCUMENTS

| CN | 110516561 A | * | 11/2019 | ........... G06K 9/0063 |
| DE | 102020200340 A1 | * | 7/2021 | ........... G06K 9/6228 |
| WO | 2016178316 A1 | | 11/2016 | |

OTHER PUBLICATIONS

Daneshpazhouh et al., "Entropy-based Outlier Detection using Semi-Supervised Approach with Few Positive Examples", Jul. 6, 2014, Elsevier, pp. 77-84 (Year: 2014).*

(Continued)

*Primary Examiner* — Paulinho E Smith
(74) *Attorney, Agent, or Firm* — HAYNES AND BOONE, LLP

(57) ABSTRACT

A method, a computing device, and a non-transitory machine-readable medium for classifying documents. A document collection is sorted into a plurality of categories. A classifier corresponding to a category of the plurality of categories is trained to output a probability that a document associated with the category is of a selected type (e.g., confidential). The training includes determining, by the processor, that a cardinality of a set of negative samples in a train set is not above a pipeline threshold but is at least one and training the classifier via a first pipeline and a second pipeline using a training group that includes a first portion of a group of positive samples in the train set, a second portion of a set of negative samples in the train set, and a third portion of a group of unlabeled samples in the train set.

20 Claims, 7 Drawing Sheets

(56) References Cited

U.S. PATENT DOCUMENTS

| | | | |
|---|---|---|---|
| 11,693,687 | B1 | 7/2023 | Melkild |
| 11,693,698 | B2 | 7/2023 | Zur et al. |
| 12,346,730 | B2 | 7/2025 | Zur et al. |
| 2014/0229456 | A1* | 8/2014 | Hollifield ............ G06F 16/2365 707/697 |
| 2014/0282520 | A1 | 9/2014 | Sabharwal |
| 2018/0329951 | A1* | 11/2018 | Yu ............................ G06N 20/00 |
| 2020/0174839 | A1 | 6/2020 | Venkadasamy et al. |
| 2020/0349229 | A1* | 11/2020 | Abudalfa ................. G06F 40/30 |
| 2021/0117232 | A1* | 4/2021 | Sriharsha ............. G06F 16/1734 |
| 2021/0140938 | A1* | 5/2021 | Washio ............ G01N 33/48721 |
| 2021/0272013 | A1* | 9/2021 | Szanto .................... G06N 20/00 |
| 2022/0036003 | A1* | 2/2022 | Bali ...................... G06F 40/205 |
| 2022/0036134 | A1* | 2/2022 | Bali ........................ G06V 30/41 |
| 2022/0138631 | A1* | 5/2022 | Jaskie ..................... G06N 20/10 706/12 |
| 2023/0359493 | A1 | 11/2023 | Zur et al. |

OTHER PUBLICATIONS

Ienco et al., "Learning from Categorical Attribute Relationships for Positive-Unlabeled Classification", 2014, Proceedings of International Workshop on Representations Learning, pp. 1-14 (Year: 2014).*

Borkowski M., et al., "Predicting Cloud Resource Utilization," ACM, 2016, pp. 37-42.

Galante G., et al., "A Survey on Cloud Computing Elasticity," IEEE, 2012, 8 pages.

Yadwadkar N., "Machine Learning for Automatic Resource Management in the Datacenter and the Cloud," UCB/EECS, 2018, 125 pages.

Non-Final Office Action mailed on Sep. 27, 2024 for U.S. Appl. No. 18/314,971, filed May 10, 2023, 06 pages.

Notice of Allowance mailed on Feb. 26, 2025 for U.S. Appl. No. 18/314,971, filed May 10, 2023, 07 pages.

* cited by examiner

METHODS AND SYSTEMS FOR AUTOMATED DOCUMENT CLASSIFICATION WITH PARTIALLY LABELED DATA USING SEMI-SUPERVISED LEARNING

TECHNICAL FIELD

The present description relates to document classification, and more specifically, to methods and systems for the automated classification of electronic documents using a classifier and the training of that classifier.

BACKGROUND

Various organizations are increasingly relying on the storage, processing, and sharing of data via networked storage systems, cloud-based storage systems, other types of storage systems, or a combination thereof. Because these types of systems have the potential to leave confidential or sensitive information exposed, some organizations are turning to data loss prevention solutions to map, manage, and secure their confidential information. Confidential information may include, for example, but is not limited to, sensitive information, classified information, proprietary information, legal information, financial information, personal (e.g., human resources) information, information that the organization intends to keep private, secret, or otherwise non-public, or a combination thereof. The loss of confidential information or the loss of confidentiality may result in undesired financial, privacy, and security costs. As one example, certain recent regulations (e.g., the Global Data Protection Regulation, the California Consumer Privacy Act, etc.) have resulted in substantial increases to the cost of a data breach. As another example, the public disclosure of confidential information may lead to missed business opportunities, reduced marketing capabilities, personal costs to business employees, and/or other types of costs. Currently available data loss prevention solutions, however, may be limited in their ability to accurately identify confidential or sensitive information. Further, manually tagging electronic documents to identify those documents that are confidential or sensitive may be more time-consuming than desired and, in many cases, cost-prohibitive. Such manual annotation methods may be vulnerable to human error.

BRIEF DESCRIPTION OF THE DRAWINGS

The present disclosure is best understood from the following detailed description when read with the accompanying figures.

DETAILED DESCRIPTION

Figure 1:
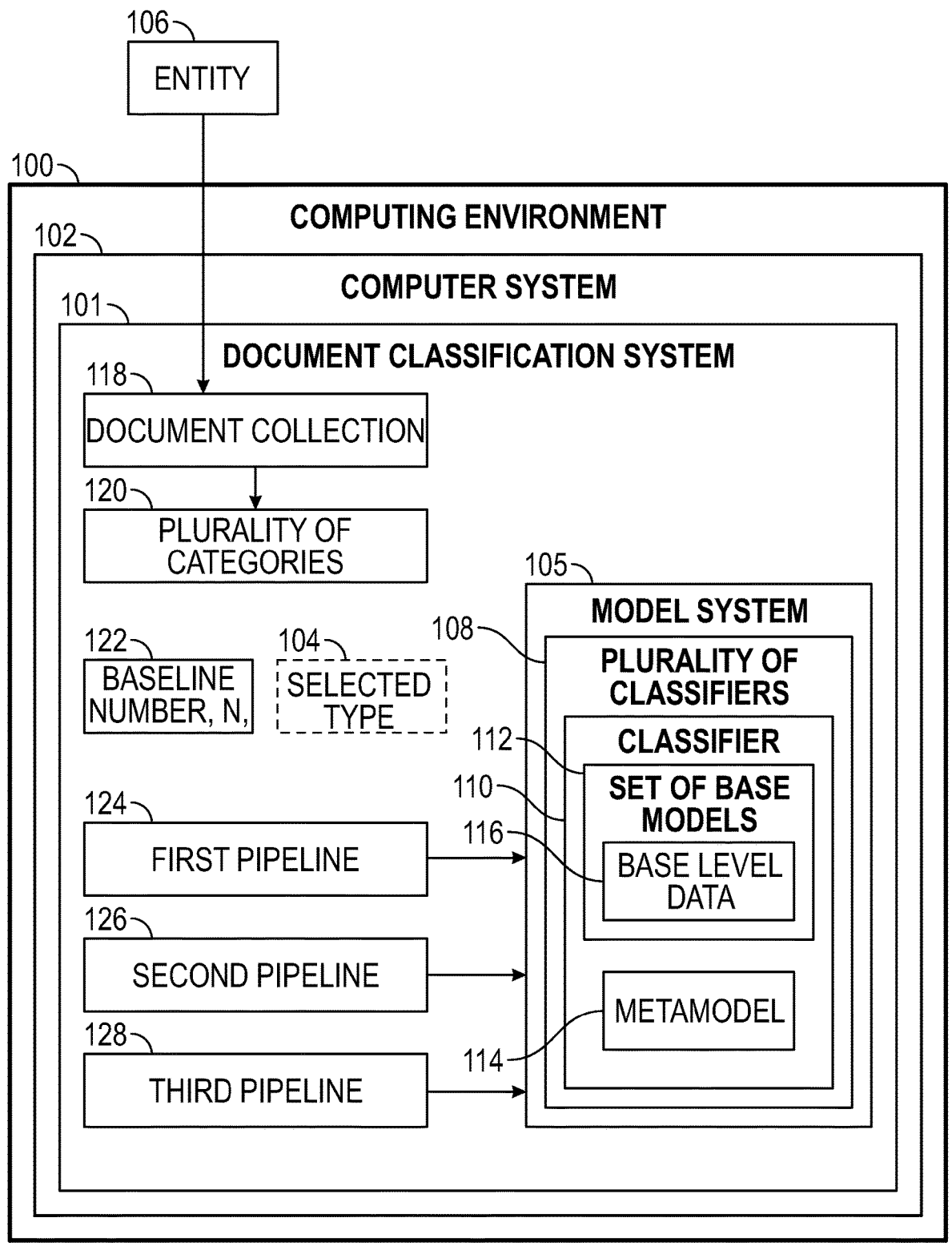
FIG. 1 is a block diagram illustrating a computing environment in accordance with one or more example embodiments.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The various embodiments described herein provide methods, systems, and machine-readable media for practically, efficiently, and accurately automating the classification of electronic documents. For example, the methods, systems, and machine-readable media described herein enable the accurate classification of documents as being either confidential or nonconfidential. A confidential document is one that includes at least some confidential information. And, as described above, confidential information may include, for example, but is not limited to, sensitive information, classified information, proprietary information, legal information, financial information, personal information, information that a person, group of persons, or organization intends to keep private, secret, or otherwise non-public, or a combination thereof. In some cases, a confidential document may also be referred to as a private document. A nonconfidential document is a document that does not include any confidential information. A nonconfidential document may also be referred to as a public document.

The various embodiments described herein provide a systemized, multi-step approach to classifying documents that is capable of detecting confidential information with respect to the proper context with a great level of accuracy as compared to some currently available rule-based or context-based document classification methods. For example, some currently available rule-based methods involve searching documents for one or more of text strings from a fixed set or dictionary of text strings preselected as being related to confidential information. But such rule-based methods may be prone to a high false positive rate given that not every document that contains such a text string is necessarily confidential. Further, these rule-based methods may not have the desired level of sensitivity across entities or organizations as not every document will follow the exact pattern of or match to a particular text string. Still further, maintaining the fixed set or dictionary of text strings over time may be more cumbersome and time-consuming than desired. Thus, the methods, systems, and machine-readable media described herein provide a more robust method for classifying documents that takes into account the variability in words and phrases used in conjunction with confidential information across a collection of documents.

Other currently available methods involve statistically analyzing the context of documents. These context-based methods may extract features from an entire corpus (or collection) of documents within an organization to identify a generalization of what it means for a document to belong to a certain confidentiality level. These context-based methods, however, yield generalizations that do not take into account that different types of documents may be considered confidential for different reasons. For example, the context that makes a human resources document confidential may be different from the context that makes a legal document or a financial document confidential. Thus, the methods, systems, and machine-readable media described herein take into account that different categories (or domains) of documents may have different contexts associated with confidential information.

The methods, systems, and machine-readable media described herein provide a multi-staged and multi-pipelined process for classifying documents by determining the probability that a given document associated with a particular category contains confidential information. This probability is determined using a classifier that has been trained to detect confidential information within the context of the particular category. For example, given a document collection, a document classification system sorts the document collection into a plurality of categories (e.g., "Finance," "Legal," "Human Resources (HR)," etc.). The document classification system then trains a classifier for each of the categories. The text of the documents belonging to a particular category forms the "corpus" of documents from which the corresponding classifier is trained. In particular, at least one training set is identified for each category. A training set for a particular category is a sampling of documents belonging to that category. For each category, a classifier corresponding to that category is trained, using the at least one training set, to output a probability that a document associated with the corresponding category is of a selected type (e.g., is "confidential"). This training includes using various pipelines of processing.

As one example, when the selected type of interest is "confidential," each training set includes confidential samples (positive samples) and unlabeled samples. Confidential samples are those labeled as being confidential (positively labeled). Unlabeled samples are those that are not labeled as being confidential or nonconfidential. In some cases, the training set also includes nonconfidential samples (negative samples). Nonconfidential samples are those labeled as being nonconfidential (negatively labeled). The various pipelines of training take into account the various possible distributions of confidential, nonconfidential, and unlabeled samples during the training of the classifier for a corresponding category of documents.

For example, training the classifier for a particular category may include determining whether a cardinality of a set of negative samples (e.g., nonconfidential samples) in the training set is above a pipeline threshold. This pipeline threshold is selected to help route the samples into the proper one or more pipelines of training. If the cardinality of the set of negative samples is above the pipeline threshold, training is performed using three different pipelines. The first pipeline uses positive samples and unlabeled samples only. The second pipeline uses positive samples, negative samples, and unlabeled samples, where the negative samples and unlabeled samples are combined into a single class. The third pipeline uses only positive samples and negative samples. If the cardinality of the set of negative samples is below the pipeline threshold but at least one, the first pipeline and the second pipeline are used. If the cardinality of the set of negative samples is zero, only the first pipeline is used. Thus, training may be performed even when the document collection does not include any or does not include many negative samples. This type of training reduces the processing resources and/or manpower that would be needed to first tag or flag negative samples in the document collection prior to training.

The first pipeline and the second pipeline utilize semi-supervised learning (e.g., Positive-Unlabeled (PU) learning), while the third pipeline utilizes supervised learning. The methods, systems, and machine-readable media described herein enable the robust and accurate detection of documents of a selected type (e.g., confidential) from within a document collection, while taking into account the context of the category to which those documents belong, even when the document collection used for training does not include any or many negative samples.

Referring now to the figures, FIG. 1 is a block diagram illustrating a computing environment 100 in accordance with one or more example embodiments. The computing environment 100 includes a document classification system 101. The document classification system 101 may be implemented using hardware, software, firmware, or a combination thereof. In one or more examples, the document classification system 101 is implemented within a computer system 102. The computer system 102 may include a processor, a single computer, or multiple computers in communication with each other. In other examples, the document classification system 101 is implemented as a service that is provided by or otherwise associated with a cloud computing platform. In some examples, the document classification system 101 includes non-transitory computer-readable media that may be read using the computer system 102 or the machine-executable code stored on such non-transitory computer-readable media.

The document classification system 101 is used to classify documents as being either of a selected type 104 or not of that selected type 104. In one or more examples, the selected type 104 is "confidential," where a document that is confidential (i.e., a confidential document) contains at least some confidential information. A document that is not confidential (i.e., a nonconfidential document) is one that includes no confidential information. Confidential information may include, but is not limited to, sensitive information, classified information, proprietary information, legal information, financial information, personal information, information that a person, group of persons, or organization intends to keep private, secret, or otherwise non-public, or a combination thereof. A confidential document may also be referred to as a private document. A nonconfidential document may also be referred to as a public document. Although the embodiments described herein are discussed with respect to the selected type 104 being "confidential," it should be appreciated that other embodiments may enable classification with some other "type."

The document classification system 101 uses a model system 105 to classify documents as either being of a selected type 104 or not of the selected type 104. For example, the model system 105 may be used to classify documents as being either confidential (or private) or nonconfidential (or public). In one or more examples, the model system 105 is customized or tailored for use by entity 106. The entity 106 may be, for example, a business organization, a governmental organization, an education organization, a non-profit organization, a financial institution, a legal firm, an international organization, a media company, a person, a group of persons, an enterprise, or some other type of entity. In some cases, the entity 106 manages the document classification system 101. In other examples, the document classification system 101 is a third-party service provided to the entity 106 via a cloud computing platform. For example, the document classification system 101 may be run on one or more cloud servers.

In one or more examples, customizing the model system 105 for use by the entity 106 includes ensuring that the model system 105 is capable of accurately classifying documents based on the context associated with the documents. The context for a document, in these examples, includes the category (or domain) to which the document belongs. A category (or domain) may be, for example, a human resources category, a financial category, a legal category, a marketing category, some other type of category, or a combination of two or more categories. For example, the entity 106 may be a business organization that maintains both human resource documents and financial documents. The model system 105 is capable of classifying the human resource documents in a manner different from the financial documents to ensure the proper context is taken into account.

The model system 105 may include any number of or combination of models. In one or more examples, the model system 105 includes a plurality of classifiers 108, with each of the plurality of classifiers 108 trained to classify documents belonging to a category of documents corresponding to that classifier. A classifier 110 of the plurality of classifiers 108 is constructed using at least one stacking ensemble. Stacking is a class of algorithms that involves training a "metalearner" algorithm to find an optimal combination of base learner algorithms. The goal of stacking is to ensemble together strong, diverse sets of learner algorithms. Thus, the classifier 110 may be constructed from, for example, a plurality of base models (or base learner algorithms, or base classifiers) 112 and a metamodel (or metalearner algorithm, or a metaclassifier) 114. With stacking, data output from the base models 112 is cross-validated and used to form base level (or level-one) data 116. The metamodel 114 is then trained using the base level data 116 to generate predictions about whether documents should be classified as being of the selected type 104 or not being of the selected type 104. As one example, for a given document, the metamodel 114 may generate a probability indicator that is a value indicating the likelihood of that document being of the selected type 104.

In these examples, model system 105 is trained using a document collection 118. The document collection 118 is an electronic document collection. In one or more examples, the document collection 118 belongs to the entity 106. The document collection 118 includes documents that have been identified as being of the selected type 104. Documents identified as being of the selected type 104 may be generally referred to as "positive documents" or "positively labeled documents." When the selected type 104 is "confidential," the documents in the document collection 118 that are identified as confidential are referred to as confidential (or private) documents. Further, the document collection 118 includes unidentified documents, or documents that have not been labeled as being of or not being of the selected type 104. These unidentified documents may be generally referred to as "unlabeled documents."

In some cases, the document collection 118 includes documents identified as not being of the selected type 104. Documents identified as not being of the selected type 104 may be generally referred to as "negative documents" or "negatively labeled documents." When the selected type 104 is "confidential," these documents may be referred to as nonconfidential (or public) documents.

The document classification system 101 sorts the document collection 118 into a plurality of categories 120 for processing. In some examples, the categories 120 may be specific to or relevant to the entity 106. In other examples, the categories 120 are general categories not specific to any particular entity 106. The categories 120 may include, for example, a human resources category, a financial category, a legal category, a marketing category, and some other type of category, or any combination thereof.

For each of the categories 120 that includes at least a baseline number 122, N, of documents identified as being of the selected type 104 (i.e., positive documents), the document classification system 101 performs training using two or more of a first pipeline 124, a second pipeline 126, and a third pipeline 128. The baseline number 122, N, may be, for example, 1,000 documents, 5,000 documents, 10,000 documents, 50,000 documents, 100,000 documents, 250,000 documents, 500,000 documents, 1,000,000 documents, or some other selected number of documents. The baseline number 122, N, is selected to ensure sufficient documents of the selected type 104 are available for proper training.

A "pipeline" is a particular type of training process corresponding to a particular combination of input documents. The first pipeline 124 is a training process that utilizes only positive documents and unlabeled documents. The second pipeline 126 is a training process that utilizes positive documents, negative documents, and unlabeled documents. And the third pipeline 128 is a training process that utilizes only positive documents and negative documents. In one or more examples, the first pipeline 124 and the second pipeline 26 are implemented using semi-supervised learning (e.g., Positive-Unlabeled (PU) learning). The third pipeline 128 is implemented using supervised learning.

A discussion of how the model system 105 of the document classification system 101 is trained and then used to classify documents is provided below via FIGS. 2-6. In particular, an example of one manner in which the semi-supervised learning may be implemented for the first pipeline 124 and the second pipeline 126 is described in FIG. 4 below. Further, an example of one manner in which supervised learning may be implemented for the third pipeline 132 is described in FIG. 5 below.

In this manner, each of the classifiers 108 is constructed and trained such that each of the classifiers 108 is capable of accurately predicting the likelihood that a document in a corresponding category is of the selected type 104 (e.g., confidential) with selected tolerances. After the classifiers 108 corresponding to the categories 120 have been trained, the model system 105 may be used to classify unlabeled documents belonging to any one or more of the categories 120. For example, the model system 105 may be used to classify the unlabeled documents in the document collection 118, unlabeled documents from another document collection from the same entity 106, unlabeled documents provided by a different entity, or a combination thereof.

Figure 2:
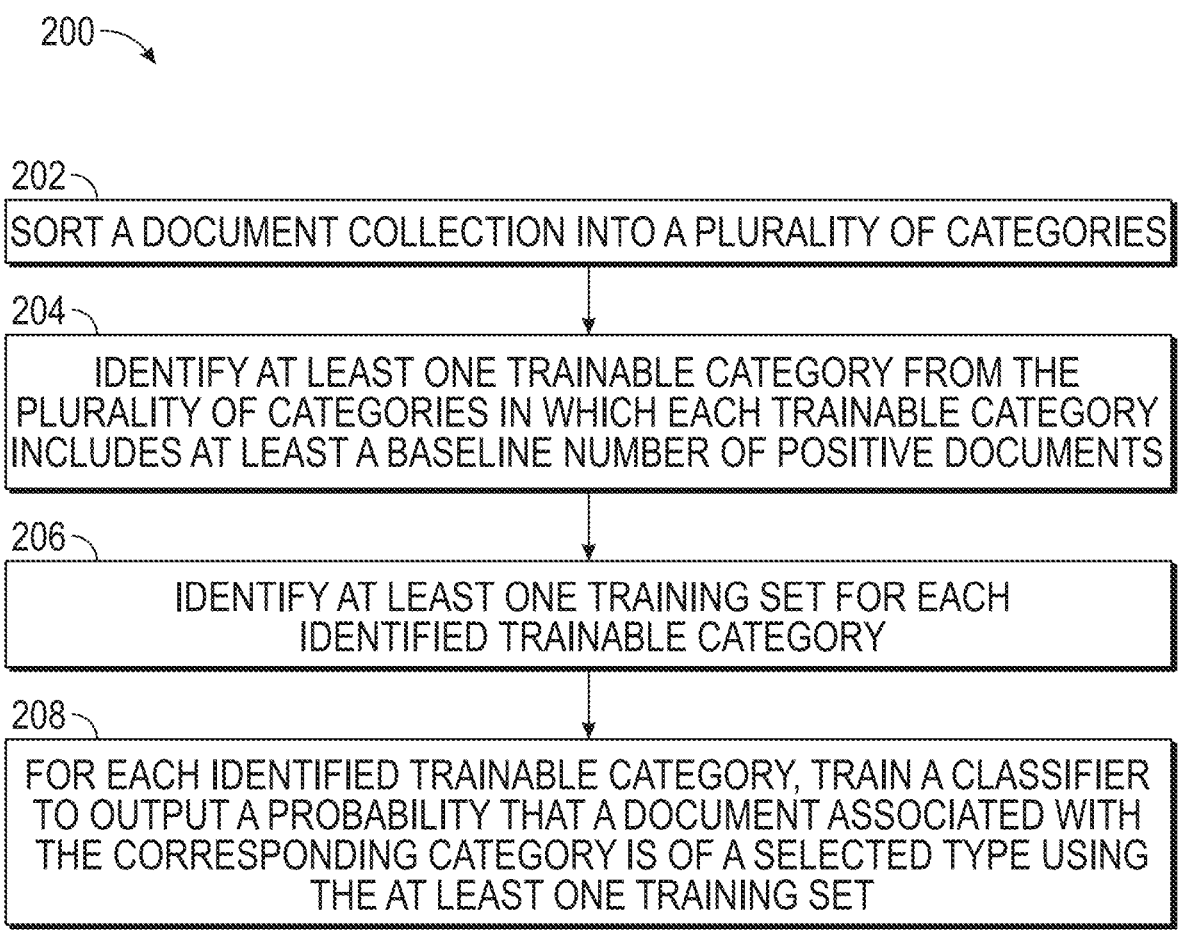
FIG. 2 is a flowchart illustrating a process for training a classifier to classify documents in accordance with one or more example embodiments.

FIG. 2 is a flowchart illustrating a process 200 for training a classifier to classify documents in accordance with one or more example embodiments. The process 200 in FIG. 2 may be implemented using the document classification system 101 of FIG. 1.

The process 200 begins by sorting a document collection into a plurality of categories (operation 202). The document collection is an electronic document collection, such as the document collection 118 described with respect to FIG. 1. In one or more examples, the document collection is provided by an entity. In some examples, the categories are specific to or correspond to that entity. In one or more examples, the document collection may be retrieved from a storage system over one or more communications links in response to a training phase of the classifier being initiated.

The process 200 includes identifying at least one trainable category from the plurality of categories in which each trainable category includes at least a baseline number of positive documents (operation 204). A positive document is a document that has been labeled as being of a selected type that is of interest (e.g., labeled as "confidential"). The baseline number, N, may be, for example, 1,000, 5,000, 8,000, 10,000, 15,000 or some other number. In some cases, the baseline number, N, is a number between about 1,000 and about 10,000 or a number between about 10,000 and 25,000. The baseline number, N, is selected to ensure that a sufficient number of positive documents are available for proper training based on the selected category. In this manner, only those categories with the proper number of positive documents are used for training. In some examples, all categories in the plurality of categories may include the proper number of positive documents and are thus identified as trainable categories.

At least one training set is identified for each identified trainable category (operation 206). A training set is a sampling of documents from the portion of the document collection associated with the corresponding category, with each document in the training set being referred to as a "sample." The training set includes, for example, a group of positive samples, a set of negative samples, and a group of unlabeled samples. As used herein, a "group of" items include two or more items. Thus, a group of positive samples includes two or more positive samples, and a group of unlabeled samples includes two or more unlabeled samples. As used herein, a "set of" items includes zero, one, two, or more items. A set of items may be referred to as a null set or an empty set when the set of items includes zero items.

A positive sample is a positive document which, as discussed above, is a document that has been labeled as being of a selected type that is of interest (e.g., labeled as "confidential"=positively labeled). A negative sample is a negative document, which as discussed above, is a document that has been labeled as being not of the selected type (e.g., labeled as nonconfidential =negatively labeled). An unlabeled sample is an unlabeled document, which as discussed above, is a document that has not been labeled with respect to the selected type (e.g., no label indicating whether confidential or nonconfidential). When there are no negative samples in a training set, that training set is considered as having a null set of negative samples.

The at least one training set in operation 206 may be identified via random sampling. For example, some predetermined number or percentage of the documents belonging to the corresponding category may be randomly selected to form a particular training set for the corresponding category. When multiple training sets are identified for a particular category, each training set associated with that particular category may include a same number of documents (e.g., each training set may include 5,000 documents). In other examples, different training sets for the same category may include different numbers of documents. In some examples, certain documents may be included in multiple training sets. In other words, some documents may overlap between the various training sets.

In some examples, operation 206 may be performed as part of a train-test split process that splits the documents for a given category into at least one training set and at least one test set. A test set includes documents that are withheld from being included in any training set such that the documents are "unseen" during the training phase and may be later used for testing and validation. In one or more examples, stratification is used to ensure that the at least one training set and the at least one test set include a similar distribution of positive samples, negative samples, and/or unlabeled samples associated with the corresponding category. In some cases, stratification may also be used to ensure that multiple training sets for the same category have a similar distribution of positive samples, negative samples, and/or unlabeled samples.

Thereafter, for each identified trainable category, a classifier is trained to output a probability that a document associated with the corresponding category is of a selected type using the at least one training set (operation 208). In one or more examples, in operation 208, a unique classifier is constructed and trained for each different trainable category. Once training has been performed for a given category, that category may then be referred to as a "trained category." For each "unseen" document associated with the trained category, the corresponding classifier is able to receive an input generated for that document and output a probability indicator that is a value indicating the likelihood that the document belongs to the selected type that is of interest (e.g., likelihood that the document is confidential). The classifiers for the various trained categories together form a model system, such as the model system 105 described with respect to FIG. 1.

Figure 3:
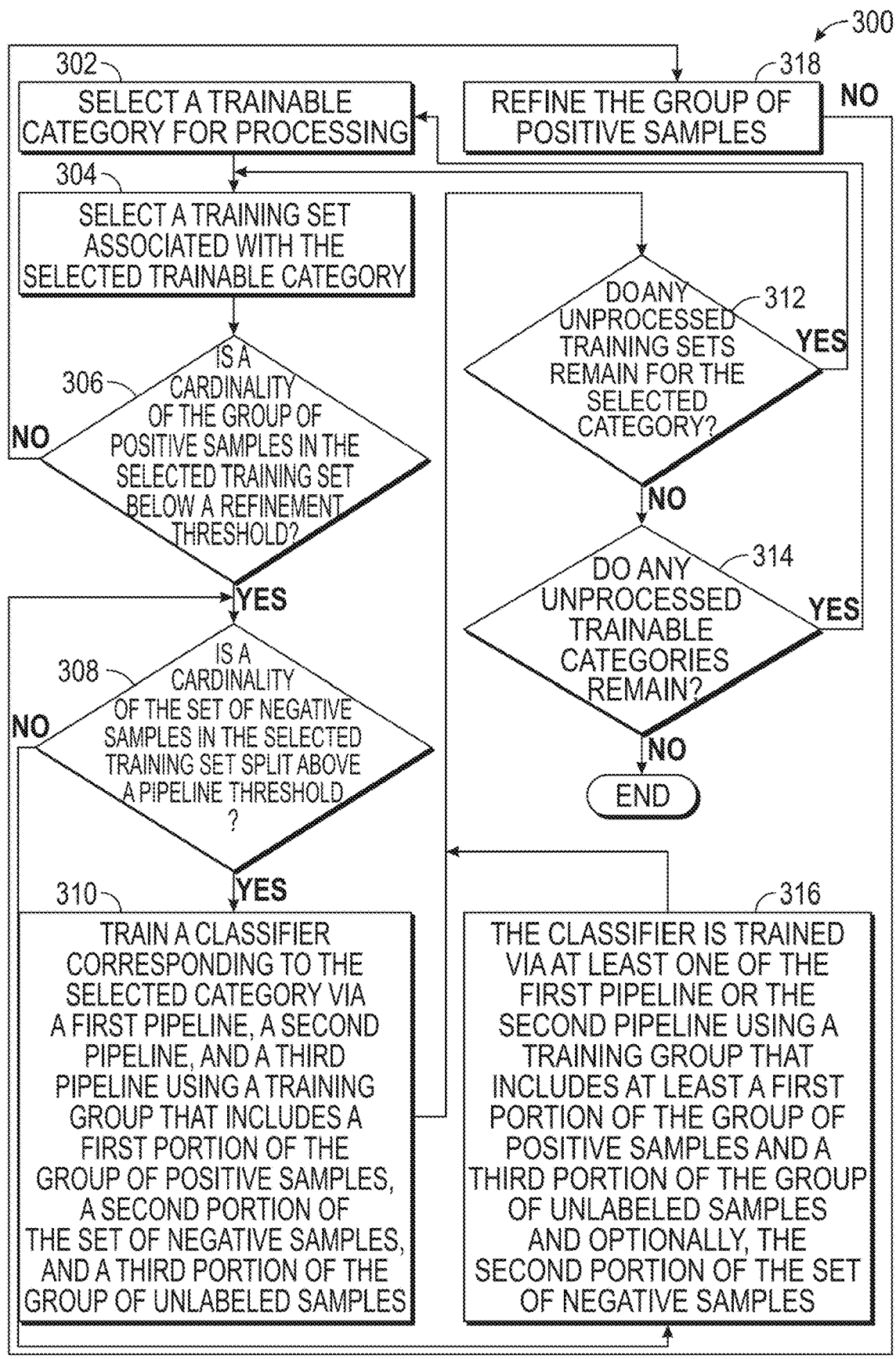
FIG. 3 is a flowchart illustrating a process for training a classifier to classify documents in accordance with one or more example embodiments.

FIG. 3 is a flowchart illustrating a process 300 for training a classifier to classify documents in accordance with one or more example embodiments. The process 300 in FIG. 3 may be implemented using the document classification system 101 of FIG. 1. Further, the process 300 is an example of one implementation for operation 208 in FIG. 2.

The process 300 begins by selecting a trainable category for processing (operation 302). The trainable category is one of the at least one trainable categories identified in operation 204 in FIG. 2.

A training set associated with the selected trainable category is selected for processing (operation 304). The training set is one of the at least one training sets identified in operation 206 in FIG. 2.

A determination is made as to whether a cardinality of the group of positive samples in the selected training set is below a refinement threshold (operation 306). The cardinality of a group of items or a set of items is the size of that group or set or, in other words, the number of elements that make up that group or set. Thus, the cardinality of the group of positive samples is the number of positive samples in that group. The refinement threshold is a value selected to determine whether the group of positive samples should be refined, and its size reduced. In other words, the refinement threshold is a threshold value selected to determine whether the group of positive samples is sufficiently large to warrant subsampling of the group of positive samples. The refinement threshold may be set by the user or operator. In one or more examples, the refinement threshold is 1,000 samples or 1,001 samples. In other examples, the refinement threshold is a number of samples between about 800 samples and about 1,200 samples. In still other examples, the refinement threshold is a number of samples between about 1,000 samples and about 1,500 samples.

If the cardinality of the group of positive samples in the selected training set is below the refinement threshold, the process 300 determines whether a cardinality of the set of negative samples in the selected training set is above a pipeline threshold (operation 308). The pipeline threshold is a value selected to determine which one or combination of the available training pipelines is to be used to train a classifier corresponding to the selected category. The refinement threshold may be set by the user or operator. The pipeline threshold may be, for example, 115 samples. In other examples, the pipeline threshold may be a value between about 80 samples and about 150 samples. In still other examples, the pipeline threshold may be a value between about 150 samples and about 250 samples. In some examples, the pipeline threshold is value between about 25 samples and about 75 samples.

If the cardinality of the set of negative samples is above the pipeline threshold, a classifier corresponding to the category is trained via a first pipeline, a second pipeline, and a third pipeline using a training group that includes a first portion of the group of positive samples, a second portion of the set of negative samples, and a third portion of a group of unlabeled samples (operation 310). The first portion of the group of positive samples may be some or all of the samples; the second portion of the set of negative samples may be some or all of the samples; the third portion of the group of unlabeled samples may be some or all of the samples. In many cases, the second portion and the third portion will include all of the set of negative samples and the group of unlabeled samples, respectively. Thus, the training group may include all of or some portion of the samples originally included in the selected training set.

In these examples, the first pipeline involves only positive and unlabeled samples or, in other words, the first portion of the group of positive samples and the third portion of the group of unlabeled samples. The first pipeline involves training the classifier using semi-supervised learning (or PU learning). The second pipeline involves positive, negative, and unlabeled samples or, in other words, the first portion of the group of positive samples, the second portion of the negative samples, and the third portion of the group of unlabeled samples. With the second pipeline, the negative samples and the unlabeled samples are combined and treated as a single class of samples. The second pipeline involves training the classifier using semi-supervised learning (or PU learning). The third pipeline involves only positive and negative samples or, in other words, the first portion of the group of positive samples and the second portion of the negative samples. The third pipeline involves supervised learning.

Thereafter, the process 300 determines whether any unprocessed training sets remain for the selected category (operation 312). If any unprocessed training sets remain, the process 300 returns to operation 304 as described above. Otherwise, a determination is made as to whether any unprocessed categories remain (operation 314). If any unprocessed categories remain, the process 300 returns to operation 302 as described above. Otherwise, the process terminates.

With reference again to operation 308, if the cardinality of the set of negative samples is not above the pipeline threshold, the classifier is trained via at least one of the first pipeline or the second pipeline using a training group that includes at least the first portion of the group of positive samples and the third portion of the group of unlabeled samples and optionally, the second portion of the set of negative samples (operation 316), with the process 300 then returning to operation 304 as described above. In this manner, determining whether the cardinality of the set of negative samples is above the pipeline threshold in operation 308 determines which combination of the three different pipelines is used for training. In operation 316, the second pipeline may only be utilized if the set of negative samples includes at least one negative sample. In other words, the second pipeline is not used in operation 316 when the set of negative samples is a null set.

With reference again to 306, if the cardinality of group of positive samples is not below the refinement threshold, the group of positive samples is refined (operation 318), with the process 300 then proceeding to operation 308 described above. The refinement in operation 318 includes subsampling the group of positive samples to refine the first portion of the group of positive samples that are sent into the various pipelines for training. In one or more examples, this subsampling is performed via cluster sampling.

For example, a two-step K-means clustering process may be used. First, all of the positive samples (e.g., all of the documents labeled confidential) in the training set are sorted into K clusters, or subgroups, in which the samples in each cluster are similar. Second, a randomly sampling of M samples is selected from each of these clusters, or subgroups, to form a refined group of positive samples that becomes the first portion of the group of positive samples in the training group sent into the training pipelines. In other examples, this two-step K-means clustering process may also be used to refine the set of negative samples to form the second portion of the set of negative samples, to refine the group of unlabeled samples to form the third portion of the group of unlabeled samples, or both as described above in operation 310, operation 316, or both.

Although cluster sampling (or subsampling) is described herein, other forms of sampling may be used. For example, random subsampling, maximum, subsampling, or another type of subsampling may be used.

Figure 4:
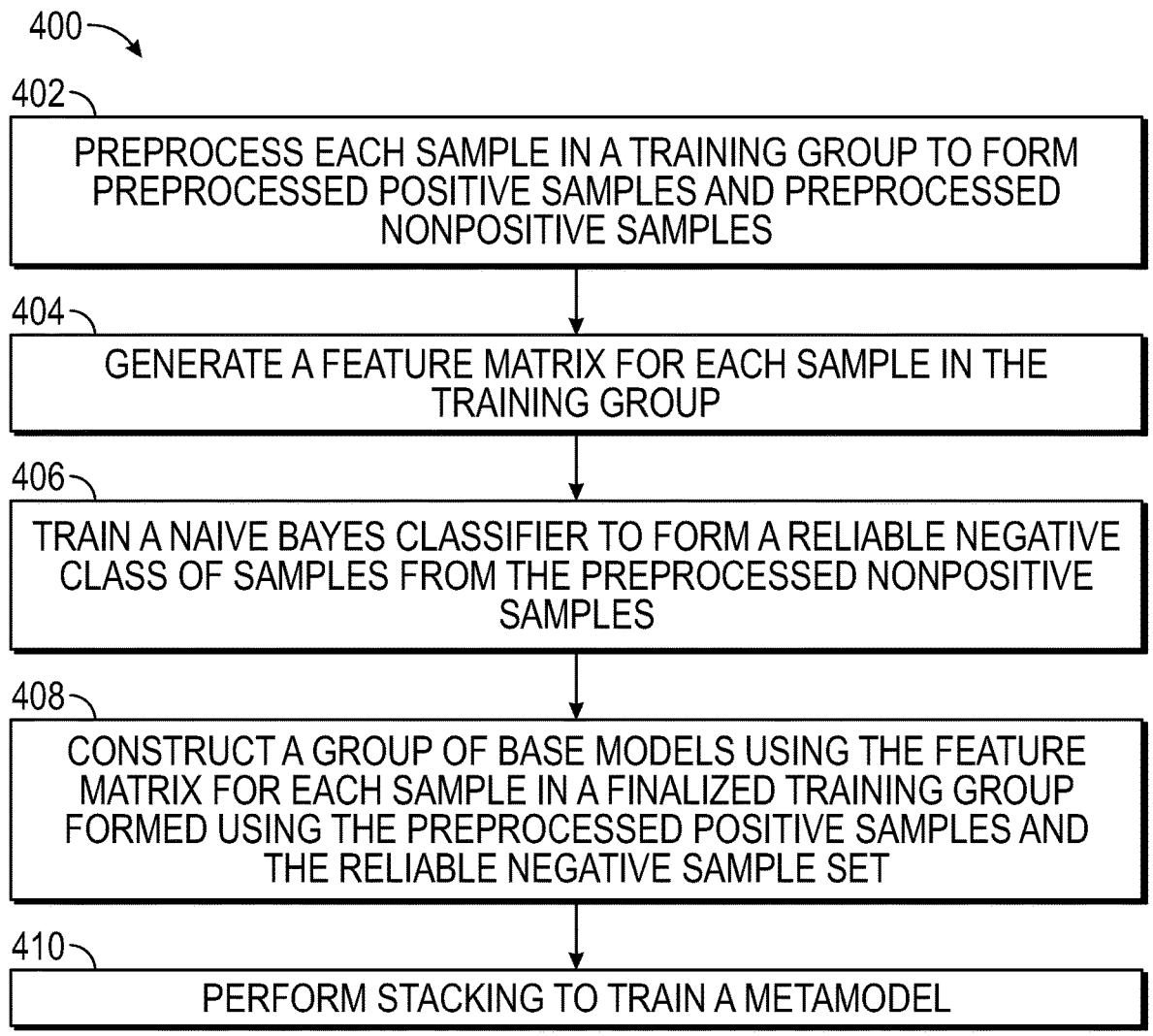
FIG. 4 is a flowchart illustrating a process for training a classifier using semi-supervised learning in accordance with one or more example embodiments.

FIG. 4 is a flowchart illustrating a process 400 for training a classifier using semi-supervised learning in accordance with one or more example embodiments. The process 400 in FIG. 4 may be implemented using the document classification system 101 of FIG. 1. Further, this process 400 may be used to train the classifier 110 described in FIG. 1 using a first pipeline (e.g., positive samples and unlabeled samples) or a second pipeline (e.g., positive samples, negative samples, and unlabeled samples). Still further, this process 400 may be an example of one manner in which training may be performed for the first pipeline and the second pipeline described in operations 310 and 316 in FIG. 3.

The process 400 includes preprocessing each sample in a training group to form preprocessed positive samples and preprocessed nonpositive samples (operation 402). The preprocessed positive samples include the preprocessed versions of all of the samples in the first portion of the group of positive samples described in operation 310 or operation 316 in FIG. 3. When this process 400 is being used for the first pipeline, the preprocessed nonpositive samples include only the preprocessed versions of samples in the third portion of the group of unlabeled samples described in operation 310 or operation 316 in FIG. 3. When the process 400 is being used for the second pipeline, the preprocessed nonpositive samples include both the second portion of the set of negative samples and the third portion of the group of unlabeled samples described in operation 310 or operation 316 in FIG. 3.

The preprocessing includes extracting raw text from each sample because the different samples may have different formats (e.g., .PDF, .doc, .ppt, etc.). The preprocessing may also include, for example, removing preselected stop words from each sample. A stop word is a commonly used word that is filtered out to enable improved processing of text data in the samples. The preselected stop words may include any group of words such as, for example, without limitation, "the," "a," "an," "is," "which," "on," "at," one or more other stop words, or a combination thereof.

In one or more examples, the preprocessing in operation 402 includes removing or replacing email addresses and dates in each sample. In some examples, the preprocessing includes removing certain characters. For example, special characters (e.g., "#," "@," "&," etc.), punctuation marks, or other types of symbols may be removed during the preprocessing. The preprocessing may include lemmatizing the text in each sample. Lemmatization of a sample includes determining the lemma of each remaining word in that sample based on its intended meaning. In some examples, the preprocessing operation 402 includes removing any marks in a sample that identify the sample as being positive for the selected type that is of interest. This removal may include removing certain text, labels, graphics, or a combination thereof. In some cases, this removal includes removing metadata that positively labels the sample as being of the selected type. As one example, when a positive sample is a confidential document, text, marks, labels, metadata, or a combination thereof that identify the document as a confidential document are removed.

Thereafter, a feature matrix is generated for each sample in the training group (operation 404). Operation 404 may be performed in different ways. In one or more examples, operation 404 includes generating one or more bags of n-grams for each sample. An n-gram is a sequence of n tokens (or words). A "bag of n-grams" is the breakup of text into various n-grams. For example, operation 404 may include dividing each sample into a bag of 1-grams (i.e., unigrams), a bag of 2-grams (i.e., bigrams), a bag of 3-grams (i.e., trigrams), or a combination thereof. In some cases, one or more other bags of n-grams may also be identified (e.g., where n=4, 5, or some other number, etc.).

As one example, the phrase "financial forecasting important" may be a phrase resulting from the preprocessing of the original phrase "financial forecasting is important" above in operation 402. In operation 404, converting this phrase into 1-grams (unigrams) yields: [financial, forecasting, important]. Converting this phrase into 2-grams (bigrams) yields: [financial forecasting, forecasting important]. Converting this phrase into 3-grams yields: [financial forecasting important].

In these examples, operation 404 further includes identifying a term frequency-inverse document frequency (TF-IDF) for each n-gram identified from the sample. As used herein, term frequency (TF) may be the frequency of a particular term (e.g., n-gram) in a sample divided by the total number of terms in the total number of documents (TND). A simpler form of TF uses the raw count of the number of times the particular term appears in a given sample. Inverse document frequency (IDF) is the log of the total number of documents (TND) divided by the number of documents where a particular term (e.g., n-gram) appears (df).

In some examples, the total number of documents (TND) may be the total number of documents in the current training group. In other examples, the total number of documents may be the total number of documents in the selected category. In yet other examples, the total number of documents may be all documents from the selected category that belong to one or more of the various training groups. In some examples, the total number of documents may be the entire document collection. With respect to the IDF, the documents considered for the df may be with respect to the particular body or corpus of documents selected for the TND. In certain cases, different weighting schemes may be used to arrive at different types of TF and IDF (e.g., for TF: log normalization, double normalization, etc.; for IDF: IDF smooth, IDF max, probabilistic IDF, etc.). The final TF-IDF for a particular n-gram is a score that is either the product or weighted product of the TF and IDF for the particular n-gram.

With reference still to operation 404, additional operations may be performed to refine the TF-IDF information generated. For example, a min_df operation may be performed to remove the TF-IDFs for n-grams that appear too infrequently (e.g., appearing in less than 1% of the TND, appearing in less than 5 documents, etc.). A max_df operation may be performed to remove the TF-IDFs for n-grams that appear too frequently (e.g., appearing in more than 50% or 75% of the TND, appearing in more than 500 documents, etc.). The max_df operation essentially removes the "stop words" that are specific to the TND.

Operation 404 may also include performing a chi-squared test to select only those TF-IDFs that are most relevant to the analysis of whether a given document is of the selected type (e.g., confidential). The TF-IDFs for the n-grams that remain after this chi-squared test form the feature matrix for the sample.

Thereafter, a Naive Bayes classifier is trained to form a reliable negative sample set from the preprocessed nonpositive samples (operation 406). An example of one manner in which operation 406 may be performed is described below with respect to FIG. 6.

Next, a group of base models is constructed using the feature matrix for each sample in a finalized training group formed using the preprocessed positive samples and the reliable negative sample set (operation 408). In one or more examples, the group of base models is constructed using a bootstrapping technique. An I number of bootstrap samples are generated, where each bootstrap sample is generated by combining (1) B instances from the preprocessed positive samples and (2) B randomly sampled instances from the reliable negative sample set. The group of base models are built using this bootstrap group. Each base model may be applied to out-of-bag (OOB) samples to generate a predicted probability value for each OOB sample. This bootstrapping process is performed iteratively to generate multiple predicted probability values for each OOB sample, with the average thereof being the final predicted probability value for each OOB sample. Examples of base models (or base classifiers) may include, for example, a Logistic Regression classifier, a Naive Bayes classifier, a support vector machine (SVM) classifier, a neural network, multiple neural networks, another type of classifier, or a combination thereof.

Thereafter, stacking is performed to train a metamodel (or metaclassifier) (operation 410), with the process terminating thereafter. With stacking, a new dataset is constructed using the predicted probability outputs from each of the group of base models as the input. For example, if the original dataset was $D=\{x(i), y(i)\}^m_{i=1}$, new samples $\{x(i)_{meta}, y(i)\}$ where $x_{meta}=\{h_i(x_i), h_2(x_i), \ldots h_T(x_i)\}$ and the target labels y(i) stay the same as before. The metamodel is trained based on the newly constructed dataset. The metamodel learns how to best combine the group of base models by assigning each base model a weight. Once trained, the metamodel may be capable of predicting the probability that a given unlabeled sample belonging to the corresponding category is of the selected type that is of interest (e.g., confidential).

Figure 5:
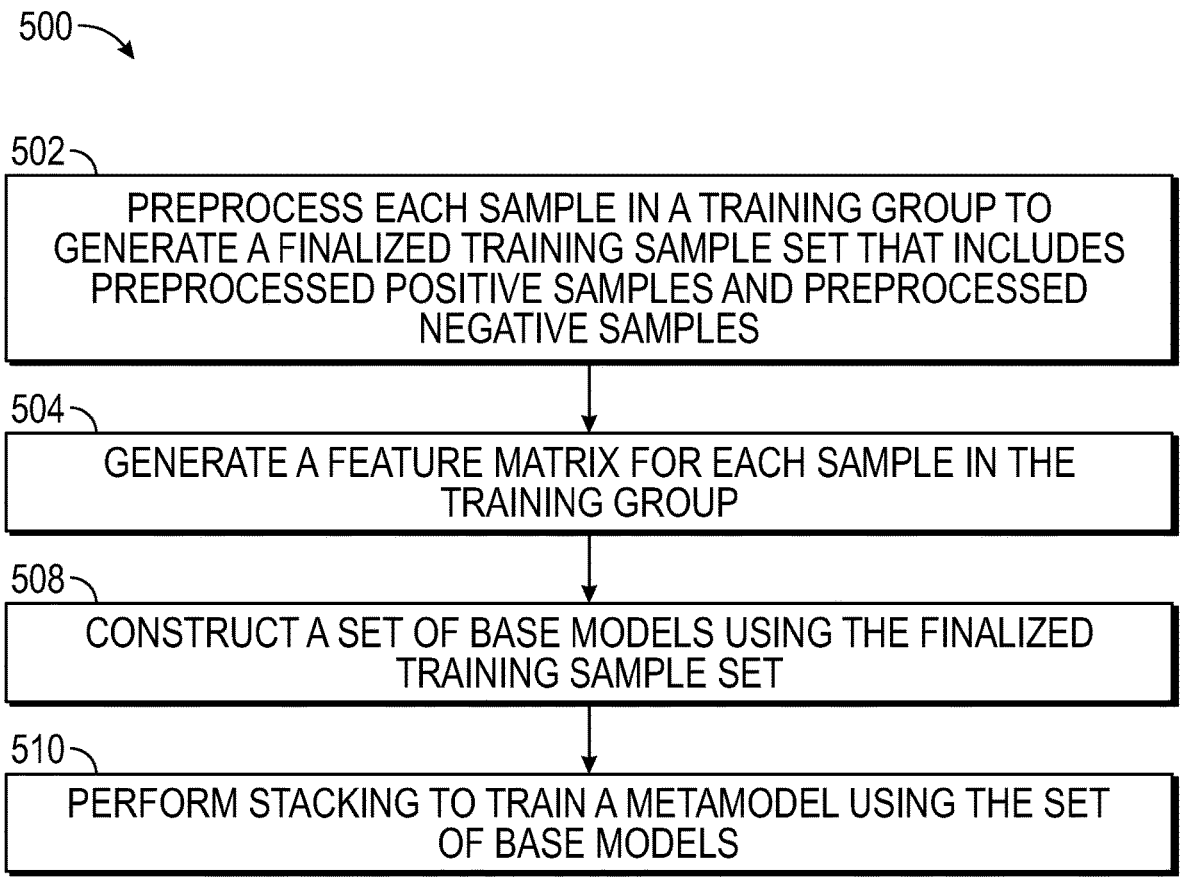
FIG. 5 is a flowchart illustrating a process for training a classifier using supervised learning in accordance with one or more example embodiments.

FIG. 5 is a flowchart illustrating a process 500 for training a classifier using supervised learning in accordance with one or more example embodiments. The process 500 in FIG. 5 may be implemented using the document classification system 101 of FIG. 1. Further, this process 500 may be used to train the classifier 110 described in FIG. 1 using a third pipeline (e.g., positive samples and negative samples). Still further, this process 500 may be an example of one manner in which training may be performed for the third pipeline described in operation 310 in FIG. 3.

The process 500 includes preprocessing each sample in a training group to generate a finalized training sample set that includes preprocessed positive samples and preprocessed negative samples (operation 502). The preprocessing in operation 502 may be performed in a manner similar to the operation 402 in FIG. 4.

Thereafter, a feature matrix is generated for each sample in the training group (operation 504). Operation 504 may be performed in a manner similar to the operation 404 in FIG. 4.

Next, a group of base models is constructed using the finalized training sample set (operation 506). The group of base models may include, for example, a Logistic Regression classifier, a Naive Bayes classifier, a support vector machine (SVM) classifier, one or more neural networks, another type of classifier, or a combination thereof.

Thereafter, stacking is performed to train a metamodel (or metaclassifier) using the group of base models (operation 508), with the process terminating thereafter. As described above with respect to FIG. 4, with stacking, a new dataset is constructed using the predicted probability outputs from each of the group of base models as the input. For example, if the original dataset was $D=\{x(i), y(i)\}^m_{i=1}$, new samples $\{x(i)meta, y(i)\}$ where $x_{meta}=\{h_1(x_i), h_2(x_i), \ldots h_T(x_i)\}$ and the target labels y(i) stay the same as before. The metamodel is trained based on the newly constructed dataset. The stacking metamodel learns how to best combine the group of base models by assigning each base model a weight. Once trained, the metamodel may be capable of predicting the probability that a given unlabeled sample belonging to the corresponding category is of the selected type that is of interest (e.g., confidential).

Figure 6:
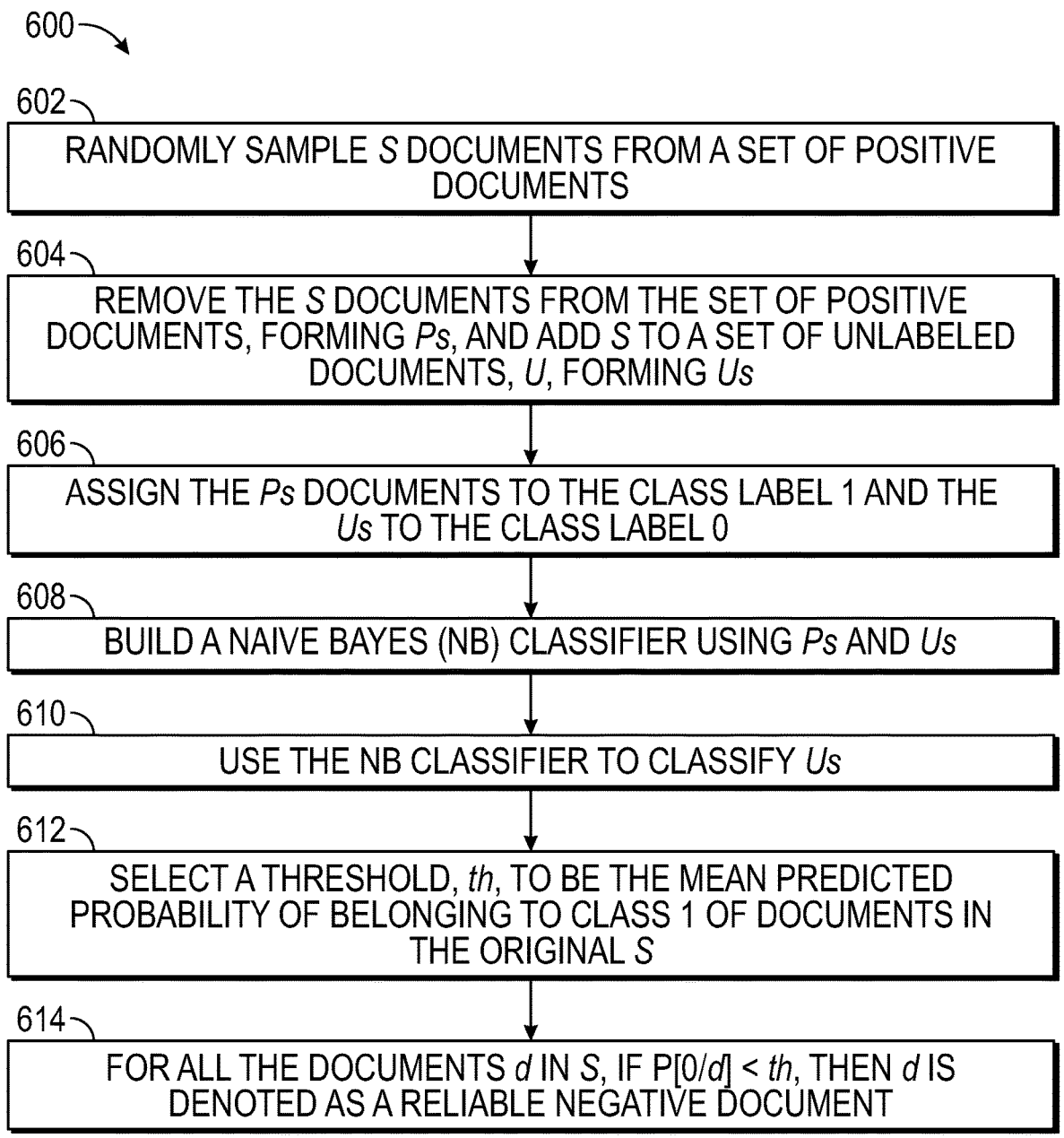
FIG. 6 is a flowchart illustrating a process for identifying reliable negative samples from a group of unlabeled samples in accordance with one or more example embodiments.

FIG. 6 is a flowchart illustrating a process 600 for identifying reliable negative samples from a group of unlabeled samples in accordance with one or more example embodiments. The process 600 in FIG. 5 may be implemented using the document classification system 101 of FIG. 1. The process 600 may be an example of one process that may be used to implement operation 406 in FIG. 4. The process 600 utilizes a spy technique that uses positive samples to help identify those samples of the group of unlabeled samples that behave similarly to the positive samples.

The process 600 may begin by randomly sampling S documents from a group of positive documents (operation 602). The S documents are removed from the group of positive documents, forming Ps, and added to a group of unlabeled documents, U, forming Us (operation 604). In these examples the S documents may be referred to as spy samples.

The Ps documents are assigned to the class label 1 and the Us documents are assigned to the class label 0 (operation 606). A Naive Bayes (NB) classifier is built using Ps and Us (operation 608). The NB classifier is used to classify Us (operation 610). A threshold, th, is selected to be the mean predicted probability of belonging to class 1 of documents in the original S (operation 612). For all the documents d in S, if P[0ld]<th, then d is denoted as a reliable negative document (operation 614), with the process terminating thereafter).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
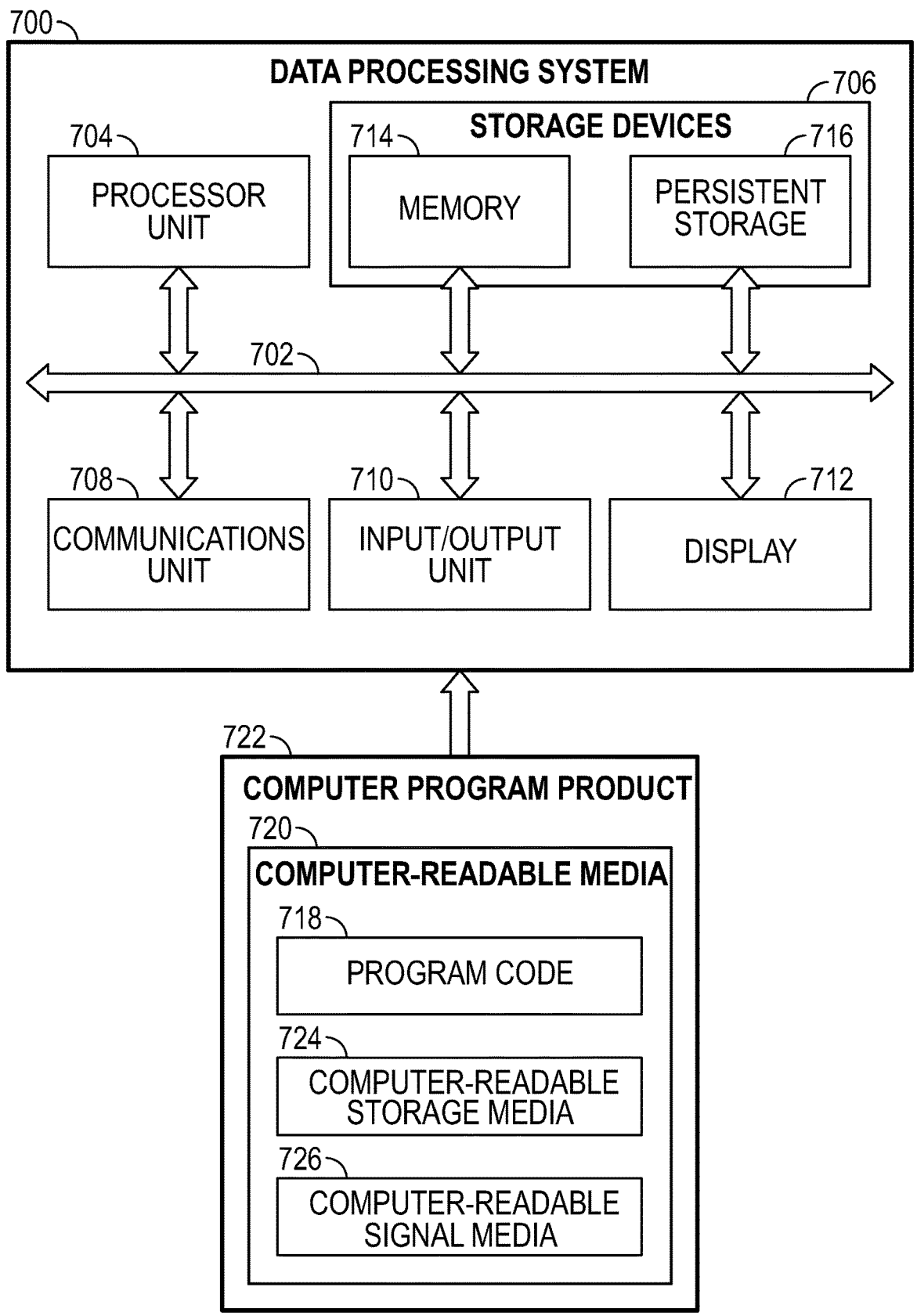
FIG. 7 is a block diagram of a data processing system in accordance with an illustrative embodiment.

FIG. 7 is a block diagram of a data processing system in accordance with one or more embodiments. Data processing system 700 may be used to implement computer system 102 in FIG. 1. As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multiprocessor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer-readable storage device, is any piece of hardware capable of storing information on a temporary and/or permanent basis. This information may include, but is not limited to, data, program code, and/or other information.

Memory 714 and persistent storage 716 are examples of storage devices 706. Memory 714 may take the form of, for example, a random-access memory or some type of volatile or non-volatile storage device. Persistent storage 716 may comprise any number of components or devices. For example, persistent storage 716 may comprise a hard drive, a solid state drive, a flash memory, a rewritable optical disk, a rewritable magnetic tape, or some combination of the above. The media used by persistent storage 716 may or may not be removable.

Communications unit 708 allows data processing system 700 to communicate with other data processing systems and/or devices. Communications unit 708 may provide communications using physical and/or wireless communications links.

Input/output unit 710 allows input to be received from and output to be sent to other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touch screen, a laser display, a holographic display, a virtual display device, and/or some other type of display device.

In this illustrative example, the processes of the different illustrative embodiments may be performed by processor unit 704 using computer-implemented instructions. These instructions may be referred to as program code, computer-usable program code, or computer-readable program code and may be read and executed by one or more processors in processor unit 704.

In these examples, program code 718 is located in a functional form on computer-readable media 720, which is selectively removable, and may be loaded onto or transferred to data processing system 700 for execution by processor unit 704. Program code 718 and computer-readable media 720 together form computer program product 722. In this illustrative example, computer-readable media 720 may be non-transitory (e.g., computer-readable storage media 724) or transitory (e.g., computer-readable signal media 726).

Computer-readable storage media 724 is a physical or tangible storage device used to store program code 718 rather than a medium that propagates or transmits program code 718. Computer-readable storage media 724 may be, for example, without limitation, an optical or magnetic disk or a persistent storage device that is connected to data processing system 700.

Alternatively, program code 718 may be transferred to data processing system 700 using computer-readable signal media 726. Computer-readable signal media 726 may be, for example, a propagated data signal containing program code 718. This data signal may be an electromagnetic signal, an optical signal, and/or some other type of signal that can be transmitted over physical and/or wireless communications links.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

The present embodiments can take the form of an entirely hardware embodiment, an entirely software embodiment, or an embodiment containing both hardware and software elements. Accordingly, it is understood that any operation of the computing systems of the computer system 102 in FIG. 1 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
sorting, by a processor, a document collection comprising a plurality of electronic documents into a plurality of categories;
identifying, by the processor, a training set for a category of the plurality of categories, the training set comprising a portion of the plurality of electronic documents;
training, by the processor, a classifier corresponding to the category to output a probability that an electronic document associated with the category belongs to a selected type using the training set, wherein the training comprises:
determining, by the processor, that a cardinality of a set of negative samples in the training set is not above a pipeline threshold but is at least one; and
preprocessing, by the processor, each document in the training set to extract raw text from each sample to thereby form a group of positive samples that are preprocessed and a group of nonpositive samples that are preprocessed;
generating, by the processor based on the determining that the cardinality is not above the pipeline threshold, respective first and second finalized training groups using the preprocessed positive samples and a negative sample set, the negative sample set derived at least in part from the group of preprocessed nonpositive samples based on predicted probabilities that one or more of the preprocessed nonpositive samples behave similarly to a subsample of the preprocessed positive samples according to a similarity threshold, wherein the preprocessed nonpositive samples includes one or more unlabeled samples and one or more labeled negative samples;
training, by the processor, the classifier via a first pipeline using the first finalized training group, the first finalized training group generated based on a first portion of the group of positive samples in the training set and a second portion of a group of unlabeled samples without the labeled negative samples from the group of nonpositive samples in the training set, and via a second pipeline using the second finalized training group, the second finalized training group generated based on the first portion of the group of positive samples in the training set and a third portion of a group of both the labeled negative samples and the unlabeled samples from the group of nonpositive samples in the training set;
outputting the probability that the electronic document associated with the category belongs to the selected type using the classifier; and
classifying, by the classifier implemented by the processor, unlabeled documents as belonging to the selected type using the probability, the probability calculated based on the training set having negative samples not above the pipeline threshold.

2. The method of claim 1, wherein the training comprises:
training, by the processor, the classifier via the first pipeline using semi-supervised learning, wherein the first portion of the group of positive samples is assigned to a first class and the second portion of the group of unlabeled samples without negative samples is assigned to a second class.

3. The method of claim 1, wherein the training comprises:
training, by the processor, the classifier via the second pipeline using semi-supervised learning, wherein the first portion of the group of positive samples is assigned to a first class and the third portion of the group of both the negative samples and the unlabeled samples are assigned to a second class.

4. The method of claim 1, further comprising:
training, by the processor, the classifier via the first pipeline, the second pipeline, and a third pipeline in response to the cardinality of the set of negative samples being above the pipeline threshold.

5. The method of claim 1, further comprising:
determining, by the processor, that the cardinality of the set of negative samples in the training set is zero; and
training, by the processor, the classifier via the first pipeline using the first portion of the group of positive samples and the second portion of the group of unlabeled samples without negative samples.

6. The method of claim 1, wherein the preprocessing comprises:
lemmatizing each document in the training set.

7. The method of claim 1, wherein the generating further comprises:
generating a feature matrix for each sample in the groups of preprocessed positive and preprocessed negative samples;
training, by the processor, a Naive Bayes classifier to generate the negative sample set for use in the finalized training groups, wherein the negative sample set is generated based on the Naive Bayes classifier identifying subsets of the group of preprocessed nonpositive samples having predicted probabilities lower than the similarity threshold; and
constructing, by the processor, base models using the feature matrix for each sample in the finalized training groups.

8. A non-transitory machine-readable medium containing instructions that, when executed by a machine, cause the machine to:
sort a document collection comprising a plurality of electronic documents into a plurality of categories;
train a classifier corresponding to a category of the plurality of categories to output a probability that an electronic document associated with the category is confidential; and
output the probability that the electronic document associated with the category is confidential using the classifier;
wherein the instructions causing the machine to train the classifier cause the machine to:
determine that a cardinality of a set of nonconfidential samples in a training set is not above a pipeline threshold but is at least one;
preprocess each sample in the training set to extract raw text from each sample to thereby form a group of confidential samples that are preprocessed, a group of nonconfidential samples that are preprocessed, and a group of unlabeled samples that are preprocessed;
generate based on the determining that the cardinality is not above the pipeline threshold, respective first and second finalized training groups using the preprocessed confidential samples and a nonconfidential sample set, the nonconfidential sample set derived at least in part from the group of preprocessed unlabeled samples based on predicted probabilities that one or more of the preprocessed unlabeled samples behave similarly to a subsample of the preprocessed confidential samples according to a similarity threshold;
train the classifier via a first pipeline using the first finalized training group, the first finalized training group generated based on a first portion of the group of confidential samples and a second portion of the group of unlabeled samples, and via a second pipeline using the second finalized training group, the second finalized training group generated based on the first portion of the group of confidential samples and a third portion of a group having the group of unlabeled samples and the group of nonconfidential samples; and
classify, by the classifier, unlabeled documents as confidential using the probability, the probability calculated based on the training set having nonconfidential samples not above the pipeline threshold.

9. The non-transitory machine-readable medium of claim 8, wherein
the instructions causing the machine to train the classifier cause the machine to:
train the classifier via the first pipeline using semi-supervised learning, wherein the first portion of the group of confidential samples is assigned to a first class and the second portion of the group of unlabeled samples is assigned to a second class.

10. The non-transitory machine-readable medium of claim 8, wherein
the instructions causing the machine to train the classifier cause the machine to:
train the classifier via the second pipeline using semi-supervised learning, wherein the first portion of the group of confidential samples is assigned to a first class and the third portion of the group having the group of unlabeled samples and the group of nonconfidential samples are assigned to a second class.

11. The non-transitory machine-readable medium of claim 8, wherein
the instructions further cause the machine to:
train the classifier via the first pipeline, the second pipeline, and a third pipeline in response to the cardinality of the set of nonconfidential samples being above the pipeline threshold.

12. The non-transitory machine-readable medium of claim 8, wherein
the instructions causing the machine to train the classifier cause the machine to:
determine that the cardinality of the set of nonconfidential samples in the training set is zero; and
train the classifier via the first pipeline using the first portion of the group of confidential samples and the second portion of the group of unlabeled samples.

13. The non-transitory machine-readable medium of claim 8, wherein
the instructions causing the machine to train the classifier cause the machine to:
generate a feature matrix for each of the preprocessed confidential samples, preprocessed nonconfidential samples, and preprocessed unlabeled samples.

14. The non-transitory machine-readable medium of claim 8, wherein
the instructions causing the machine to train the classifier cause the machine to:

generate a feature matrix for each sample in the groups of preprocessed confidential samples, preprocessed nonconfidential samples, and preprocessed unlabeled samples;

train a Naive Bayes classifier to generate the nonconfidential sample set for use in the finalized training groups based on the Naive Bayes classifier identifying subsets of the group of preprocessed unlabeled samples having predicted probabilities lower than the similarity threshold; and constructing base models using the feature matrix for each sample in the finalized training groups.

15. A computing device comprising:

a memory containing a machine-readable medium containing instructions for performing a method of classifying electronic documents; and a processor coupled to the memory, the processor configured to execute the instructions to cause the processor to:

sort a document collection comprising a plurality of electronic documents into a plurality of categories;

train a classifier corresponding to a category of the plurality of categories to output a probability that an electronic document associated with the category belongs to a selected type using a training set, wherein in training the classifier the processor is configured to:

determine that a cardinality of a set of negative samples in the training set is zero;

preprocess each sample in the training set to extract raw text from each sample to thereby form a group of positive samples that are preprocessed and a group of unlabeled samples that are preprocessed;

generate, based on the determining that the cardinality is zero, a finalized training group using the preprocessed positive samples and a negative sample set, the negative sample set derived at least in part from the group of preprocessed unlabeled samples based on predicted probabilities that one or more of the preprocessed unlabeled samples behave similarly to a subsample of the preprocessed positive samples according to a similarity threshold;

train the classifier via a first pipeline that uses semi-supervised learning, wherein the training is performed using the finalized training group generated based on a portion of the group of positive samples and a portion of a group of unlabeled samples;

determine the probability that the electronic document associated with the category belongs to the selected type using the classifier; and classify unlabeled documents as belonging to the selected type using the probability, the probability calculated based on the training set having zero negative samples.

16. The computing device of claim 15, wherein the classifier is constructed from a set of base models and a metamodel that is trained on a new dataset constructed using a predicted probability output from each of the set of base models.

17. The computing device of claim 15, wherein the group of positive samples is a group of confidential samples.

18. The computing device of claim 15, wherein the portion of the group of positive samples is obtained via K-means clustering.

19. The computing device of claim 15, wherein in training the classifier the processor is configured to train a Naive Bayes classifier to generate the negative sample set from the group of unlabeled samples for use in training the classifier via the first pipeline, wherein the negative sample set is generated based on the Naive Bayes classifier identifying subsets of the preprocessed unlabeled samples having predicted probabilities lower than the similarity threshold.

20. The computing device of claim 15, wherein in training the classifier the processor is configured to identify spy samples from the group of positive samples for use in identifying the negative sample set from the group of unlabeled samples.

* * * * *